(No Model.)

F. M. BARTON & J. C. WILLIAMS.
BAND CUTTING ATTACHMENT FOR THRASHERS.

No. 459,734. Patented Sept. 22, 1891.

Witnesses
Geo. Snyder
Lillian C. Whitney

Inventors
Francis M. Barton and
Joseph C. Williams
By Geo. P. Whitney
Attorney

UNITED STATES PATENT OFFICE.

FRANCIS M. BARTON AND JOSEPH C. WILLIAMS, OF LIBERTYVILLE, MISSOURI.

BAND-CUTTING ATTACHMENT FOR THRASHERS.

SPECIFICATION forming part of Letters Patent No. 459,734, dated September 22, 1891.

Application filed March 6, 1891. Serial No. 384,028. (No model.)

*To all whom it may concern:*

Be it known that we, FRANCIS M. BARTON, and JOSEPH C. WILLIAMS, citizens of the United States, residing at Libertyville, in the county of St. Francis and State of Missouri, have invented certain new and useful Improvements in Band-Cutting Attachments for Thrashers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to machines for cutting the bands on bundles of grain to be thrashed. It may be made as a separate piece of mechanism, as shown in the accompanying drawings, or it may be framed into and become a part of the thrasher itself. It is arranged to stand at one side of the feeder's table, and there may be one on each side, if desired. This mechanism is geared to that of the thrasher, so that it operates continuously and acts to carry to the feeder's table the bundles of grain placed upon an endless belt, the band around the bundle being automatically severed by a knife as the bundle travels toward the feed-table.

Figure 1:
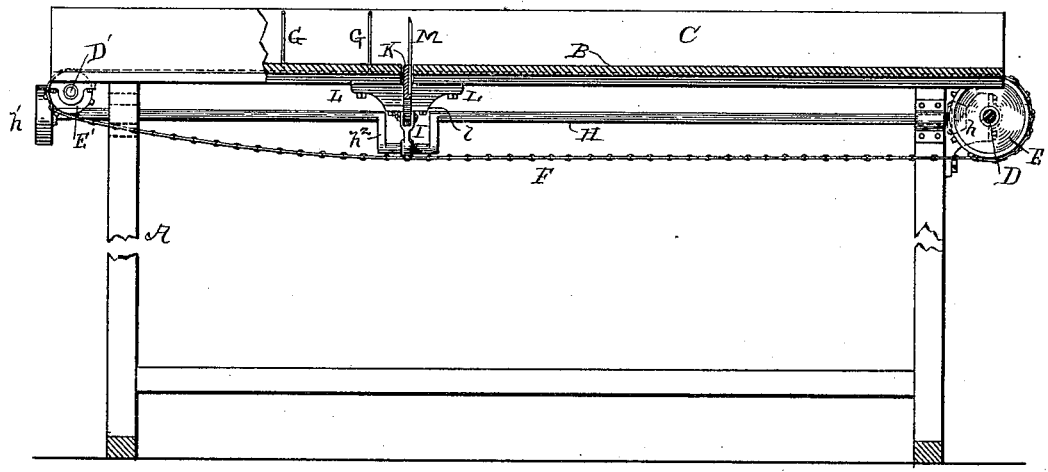
Figure 2:
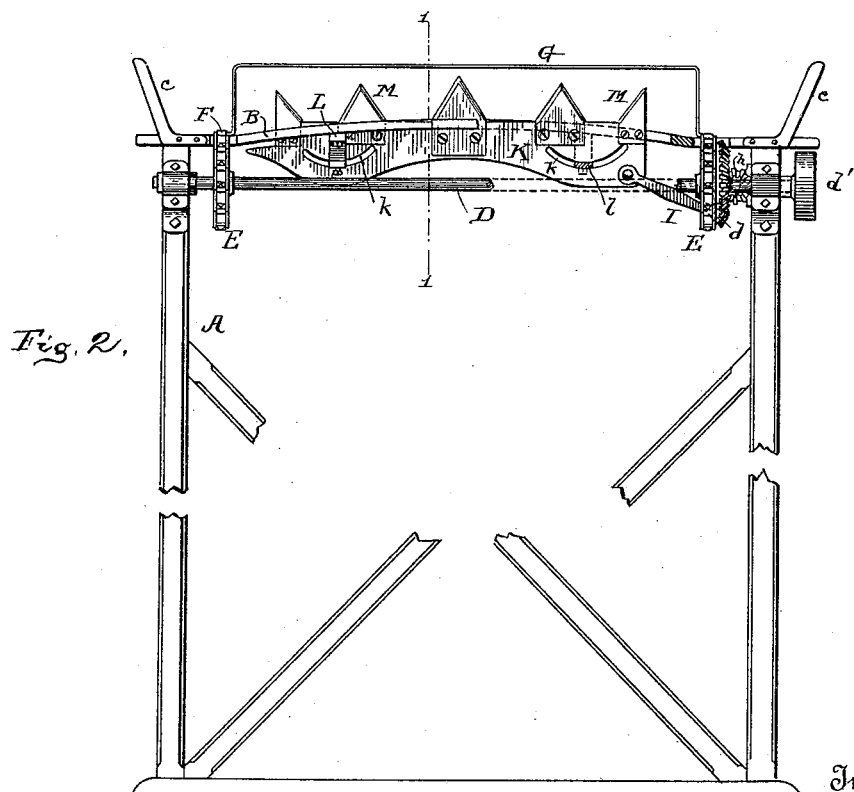

In the drawings, Figure 1 shows a longitudinal section of our machine on line 1 1, Fig. 2; and Fig. 2, an end elevation, partly broken away.

Upon a suitable supporting frame-work A is a table B, preferably straight in longitudinal direction, but slightly arched or crowning in cross-section to correspond with the way in which I prefer to arrange the knives, as hereinafter described. Along each side of the table is arranged a side board C, preferably flaring outwardly and attached to the table by the angle-irons $c$ at each end, which are capable of adjustment to and fro across the end of the table, so as to contract or widen the space between the side boards to accommodate different lengths of grain.

The mechanism for moving the bundles of grain along the table is as follows: At each end of the table are transverse shafts D D', each having a sprocket-wheel E E' near each end of it. The endless belts F, preferably composed of chain, run over these pairs of sprocket-wheels parallel with the side boards, or substantially so. Attached to the chains at suitable intervals are carriers G, consisting of long U-shaped metal rods extending across from one endless belt to the other and secured thereto, as shown. The carriers rise several inches above the table B in order to obtain a good hold upon the bundles of grain laid between them, and also to clear the top of the knife or knives used for cutting the bands. It will be readily understood that when a bundle of grain is placed between two of the carriers and the endless belts are started the grain will be carried along the table.

In order to drive the belts we provide a shaft H, running lengthwise of the table and carrying at one end a miter-pinion $h$, which meshes with a miter-gear $d$ on the shaft D. On the shaft H is a belt-pulley or flange-coupling $h'$, by means of which power can be applied to the shaft. The shaft D may also have a similar means for receiving power, as at $d'$.

The mechanism for cutting the bands is as follows: In or upon the shaft H is a crank or its equivalent $h^2$, to which is connected a pitman I, the other end of the pitman being pivoted to a reciprocating knife-bar K. The bar is sustained in guides on the under side of the table. We prefer to construct these as follows: In the knife-bar are formed two curved slots $k$, with their concave side uppermost. A block L is bolted to the table on each side of each slot, forming a guide for the knife-bar in its movements. A slide-bar $l$ is passed through each slot and is bolted to the blocks L. The slide-bars fit the slots easily, and when the knife-bar is reciprocated by the revolution of the crank $h^2$ the interaction of the slots and slides causes the knife-bar to rise at each end of its stroke, having a movement corresponding to the shape of the curved slots. Fastened to the bar are knives M, which are preferably A-shaped, like mower-knives, the end ones, however, being vertical on their outer edges. The tips of the knives are preferably arranged in a curve, as shown, the middle knife being the highest. The knife-bar and knives project up through a slot in the table, as shown. When the bundle of grain is brought by the carriers against the reciprocating knife, the band is quickly caught and severed, the upward rise of the knife insuring that the band shall not slip off, but shall be subjected to a drawing cut and not fail of being parted. The loose grain is then carried by the belts and carriers to the feed-table of the thrasher, the height and shape of the carriers insuring that it shall all be removed from the knife. The action is facilitated, also, by the drop of the knife at the middle of its stroke, which lowers the knives, so that they offer but little impediment to the motion of the grain.

Having thus described our invention, what we claim, and desire to secure by Letters Patent, is—

1. A band-cutter comprising a suitably-slotted table, a transversely-arranged knife reciprocating through the said slot across the path traversed by the bundle, and endless bands running upon the surface of the table and provided with carriers attached at either end to said bands and bent upwardly to clear the reciprocating knife, substantially as described.

2. A band-cutter comprising a suitable table, adjustable side boards therefor, an arched top, an endless chain provided with carriers for conveying the bundles of grain along the table, and a knife reciprocating through a slot in the table for cutting the bands, substantially as described.

3. A band-cutter comprising a suitably-slotted table, a transversely-arranged knife reciprocating through the said slot across the path traversed by the bundle, endless bands running upon the surface of the table and provided with carriers attached at either end to said bands and bent upwardly to clear the reciprocating knife, and suitable means for giving the knife a rising and falling motion as it is reciprocated.

4. The combination, with the table B, having a transverse slot, and a knife reciprocating therethrough, of the endless bands provided with carriers upwardly bent to avoid the knife, the knife-bar K, provided with the curved slots $k$, blocks L, fastened to the under side of the table, and the slide-bars I, secured to the blocks and passing through the slots, substantially as described.

5. The combination, with the table B, arched in cross-section, and an endless chain having carriers, of the transversely-reciprocating knife-bar provided with knives, the tips being arranged in a curve, the middle one being the highest, substantially as described.

6. The combination, with the table, of the transverse shafts D D', having the sprocket-wheels E E', the endless-chain belts F, having the carriers G, the longitudinal shaft H, the miter-gears $d\ h$, and the knife-bar K, connected with the shaft H, substantially as described.

7. The combination, with the table B, having transverse shafts at its ends, of the endless belts passing around said shafts and provided with carriers, the longitudinal shaft connected by miter-gears with the transverse shafts and having the crank $h^2$, the knife-bar K, running in guides on the under side of the table and projecting up through a slot in the table, the knives M, fastened to the knife-bar, and the pitman I, connecting the crank and the knife-bar, substantially as described.

In testimony whereof we affix our signatures in presence of two witnesses.

FRANCIS M. BARTON.
JOSEPH C. WILLIAMS.

Witnesses:
J. C. KRIMMINGER,
G. W. CROSS.